United States Patent
Beedu et al.

(10) Patent No.: US 9,912,239 B2
(45) Date of Patent: Mar. 6, 2018

(54) HOLD UP ARCHITECTURE FOR POWER SUPPLY WITH DC-DC CONVERTER

(71) Applicant: HONEYWELL INTERNATIONAL INC., Morris Plains, NJ (US)

(72) Inventors: Nishanth Beedu, Bangalore (IN); Prashant Purushotham Prabhu K, Bangalore (IN); Joseph Marotta, Boonton, NJ (US); Peter Gramata, Rovinka (SK); Stephen Young, Bradenton, FL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/215,986

(22) Filed: Jul. 21, 2016

(65) Prior Publication Data

US 2018/0026536 A1    Jan. 25, 2018

(51) Int. Cl.
*H02M 3/335* (2006.01)
*H02M 3/158* (2006.01)

(52) U.S. Cl.
CPC .................. *H02M 3/158* (2013.01)

(58) Field of Classification Search
CPC ...... H02J 7/345; H01M 10/4264; H02M 1/10; H02M 3/155; H02M 2001/0022; H02M 3/3376; H02H 3/24; Y02B 70/1491
USPC ............. 363/16–17, 21.04, 21.07, 21.11, 65, 363/71–76; 323/222, 212, 241, 237, 271, 323/282–285; 307/9.1, 71; 361/90, 93.7, 361/93.9
See application file for complete search history.

(56) References Cited

U.S. PATENT DOCUMENTS

| | | | |
|---|---|---|---|
| 6,788,557 B2 * | 9/2004 | Phadke | H02M 3/33569 307/103 |
| 7,098,557 B2 | 8/2006 | Swanson et al. | |
| 7,518,263 B2 * | 4/2009 | Gan | H02M 3/33561 307/32 |
| 7,646,186 B2 | 1/2010 | Jung et al. | |
| 7,660,133 B1 * | 2/2010 | Hwang | H02M 3/33592 363/16 |
| 7,786,620 B2 * | 8/2010 | Vuk | H01M 10/4264 307/66 |
| 8,487,591 B1 * | 7/2013 | Draper | H02J 9/00 320/166 |
| 9,024,609 B2 | 5/2015 | Milavec | |
| 9,178,439 B2 * | 11/2015 | Hwang | H02M 3/3376 |

* cited by examiner

*Primary Examiner* — Rajnikant Patel
(74) *Attorney, Agent, or Firm* — Shimokaji IP

(57) ABSTRACT

A power supply includes a DC-DC converter, a boost converter, an energy storage element; and a voltage clamping circuit. The DC-DC converter is connected to a power source with an output voltage in a first voltage range. The voltage clamper circuit is configured to discharge at least a portion of energy of the energy storage element and to produce current at a clamped output voltage range that is substantially equal to the first voltage range. The discharged energy provides hold-up time for the power supply.

6 Claims, 2 Drawing Sheets

HOLD UP ARCHITECTURE FOR POWER SUPPLY WITH DC-DC CONVERTER

BACKGROUND OF THE INVENTION

The present invention relates generally to maintaining power output from a DC-DC converter system during an interruption of input power. More particularly, the invention relates to storing energy within the converter system and releasing the stored energy to maintain output power during interruption of input power.

In modern power supplies, two critical parameters which play a major role are the efficiency and size of the power supply. Power supply engineers have to optimize the power supply such that it achieves maximum efficiency in minimum area on a circuit board. One major parameter which affects the area of the power supply is the size of an energy storage element for a holdup feature.

Hold up time or transparency time is a critical factor in the power supply designs for aero applications. Hold up time refers to the time or interval during which there is a loss of input power to the power supply. The power supply performance should not be degraded when the equipment is subjected to power cuts shorter than its transparency time.

A typical hold up time for power supplies, used in Aerospace applications, could vary from 3 milliseconds (mS) to 200 mS based on the application or the circuitry to which the DC-DC converter may be connected. Typically, the holdup time of 200 mS would call for huge energy storage capacitors in the range of hundreds-thousands of micro farads if the capacitor were charged at a voltage equivalent to the nominal input voltage of the power supply. In some prior art power supplies, filtered input voltage is boosted to a level higher than the nominal input voltage and then fed to charge a capacitor bank. Due to the boosted charging voltage, the amount of capacitance required to provide the suitable holdup time is reduced.

While such systems may reduce the amount of capacitance required, they may subject a main converter to the high boosted voltage at its input terminals. As a consequence, such a converter may need to be constructed with components that can tolerate exposure to the high boosted voltage.

As can be seen, there is a need for an efficient system and method to provide extended hold-up time for a DC-DC converter of a power supply. More particularly, there is a need for such a system and method that provides such hold-up time without subjecting the main converter to voltages higher than nominal converter input voltages.

SUMMARY OF THE INVENTION

In one aspect of the present invention, a power supply comprises a DC-DC converter; a boost converter; an energy storage element; and a voltage clamping circuit; wherein the DC-DC converter is connected to a power source with an output voltage in a first voltage range; wherein the boost converter, the energy storage element and the voltage clamper circuit are positioned on an electrical pathway that is parallel to an input of the DC-DC converter, wherein the boost converter is connected in series with the energy storage element for charging the energy storage element to a second charge voltage range, higher than the first voltage range; wherein the voltage clamper circuit is interposed between the energy storage element and the input of the DC-DC converter; and wherein the voltage clamper circuit is configured to discharge at least a portion of energy of the energy storage element and to produce current at a clamped output voltage range that is substantially equal to the first voltage range.

In another aspect of the present invention, an energy storage block for a power supply comprises a boost converter with an input connected to be provided with power at a voltage within a first voltage range; a chargeable energy storage element connected in series with the boost converter to be provided with power at a voltage within a second voltage range, the second voltage range being higher than the first voltage range; and a voltage clamping circuit connected in series with the chargeable energy storage element and having an output clamped at a voltage within the first voltage range.

In still another aspect of the present invention, a voltage clamping circuit for a power supply comprises: an input connection; an output connection; and two semiconductor clamping switches connected in a series pass configuration and interposed between the input connection and the output connection.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally may provide a system and method for hold-up time for a DC-DC converter. More particularly, the invention may provide a system and method for providing such hold-up time by delivering power at a desired voltage from an internal capacitor bank that is charged at a voltage greater than a nominal input voltage of the converter.

Figure 1:
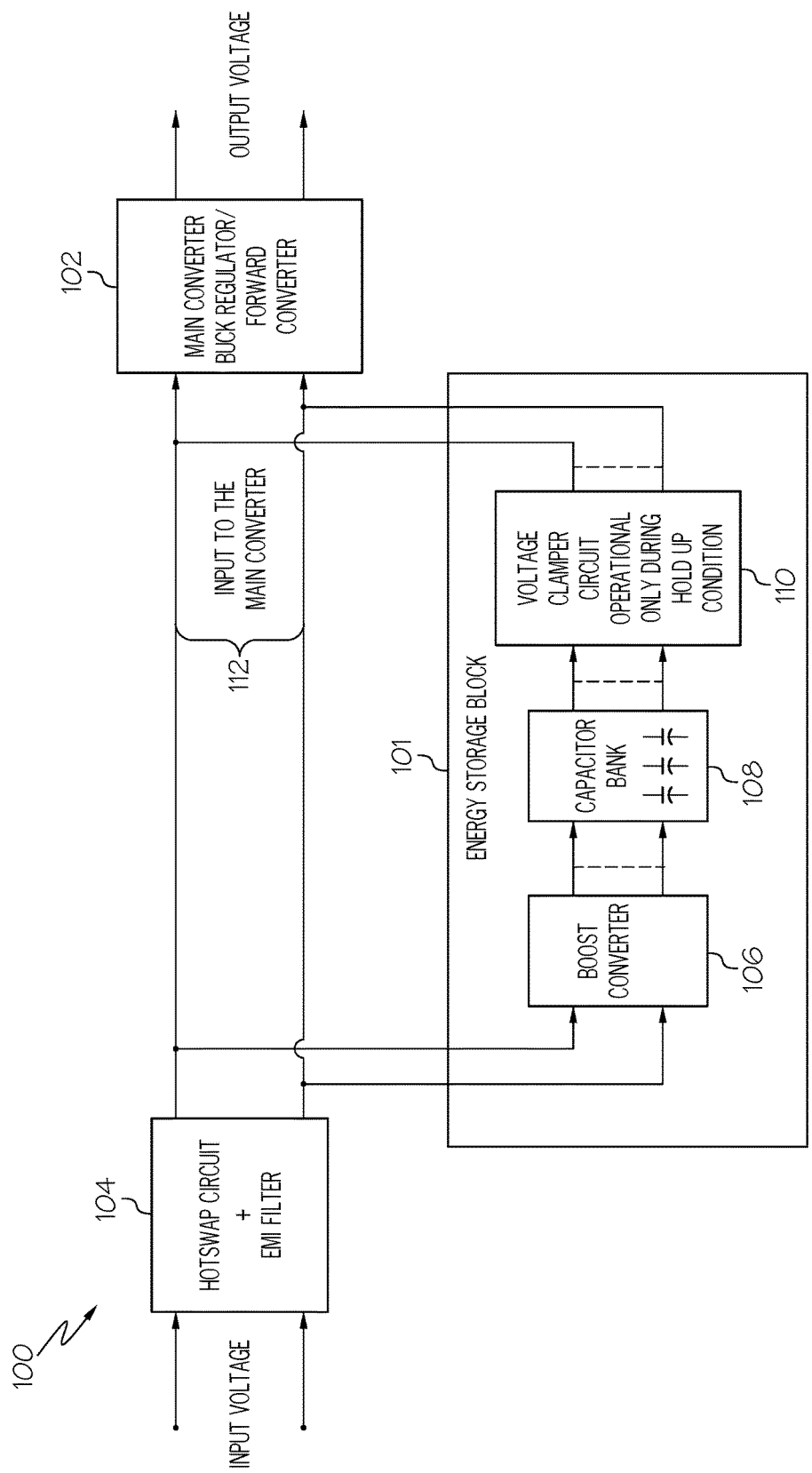
FIG. 1 is a block diagram of a power supply in accordance with an exemplary embodiment of the invention.

Referring now to FIG. 1, an exemplary DC-DC converter 102 is shown in a power supply 100 in which input power to the DC-DC converter 102 may be temporarily interrupted. In many applications, it is important to maintain output power from the DC-DC converter 102 during interruption of input power. In the exemplary embodiment of FIG. 1, the DC-DC converter 102 may be provided with input power through a hotswap circuit 104. In the case of a hot swap, interruption of power from the hotswap circuit 104 may extend for a period of time ranging from about 3 milliseconds (mS) to 200 mS. Thus, it is desirable to provide the power supply 100 with hold-up time capability (i.e., continuity of input power) for the DC-DC converter 102 during interruption of power from the hotswap circuit 104.

In an exemplary embodiment of power supply 100 hold-up capability may be provided by an energy storage block 101. The energy storage block 101 may include a boost converter 106 and a chargeable energy storage element 108. The energy storage block 101 may be connected in parallel with the DC-DC converter 102. In one embodiment the energy storage element 108 may be one or more supercapacitors. In another exemplary embodiment, shown in FIG. 1, the chargeable energy storage element 108 may be a capacitor bank 108. The capacitor bank 108 may be charged to a boost voltage Vb. The boost voltage Vb may be higher than an output range of voltage Vo of the hotswap circuit 104. A voltage clamper circuit 110 may be interposed between the capacitor bank 108 and an input 112 of the DC-DC converter 102. The voltage clamper circuit 110 may clamp the boosted voltage Vb to a range substantially equal to the voltage input range of the DC-DC converter 102 (i.e., the range output voltage Vo of the hotswap circuit 104). As explained in detail hereinbelow, the voltage clamper circuit 110 may be in operation only during a condition that requires hold-up.

Figure 2:
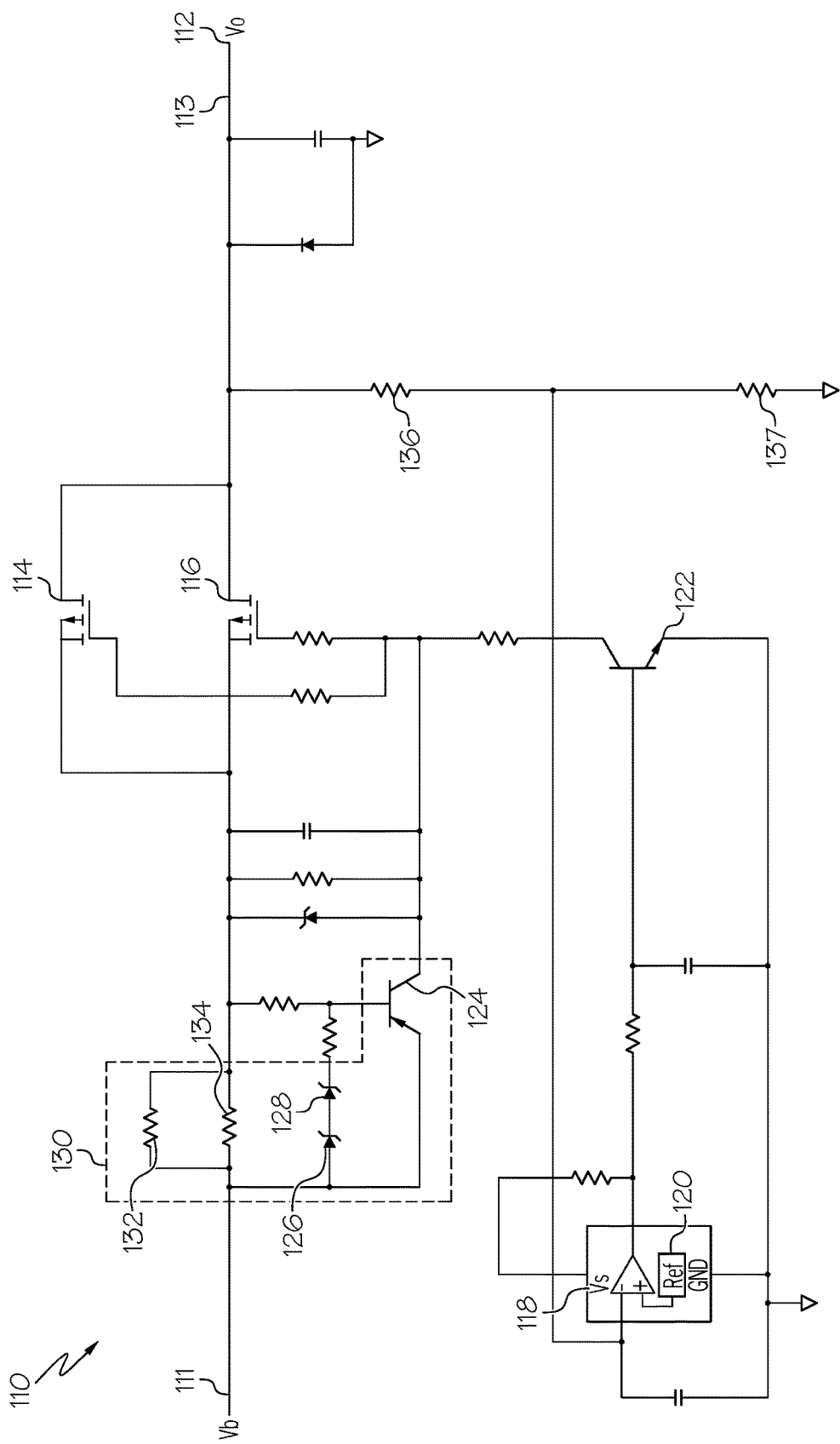
FIG. 2 is block diagram of a voltage clamping circuit of the power supply of FIG. 1 in accordance with an exemplary embodiment of the invention.

Referring now to FIG. 2, an exemplary embodiment of the voltage clamping circuit 110 is illustrated in detail. The voltage clamping circuit may include an input connection 111 and an output connection 113. Two or more clamping switches, 114 and 116, may be connected as series pass MOSFETs and may implement voltage clamping to the voltage Vo. The clamping circuit 110 may consume power only during voltage clamping activity. Such limited power consumption may be achieved through employment of a combination of under-voltage detection switches 122 and 124 and a resistor feedback circuit comprised of resistor 136 and resistor 137 along with an operational amplifier 118 with a built-in reference 120. If external feedback voltage, Vo, from the converter input 112 is less than a reference voltage Vr of the reference 120, the under-voltage detection switches 122 and 124 may enable the switches 114 and 116 to turn on and voltage clamping may occur. Conversely, if Vo equals or exceeds Vr, the switches 114 and 116 may turn off and power consumption of the clamping switches 114 and 116 may cease.

The diodes 126 and 128 may reduce temperature dependence of forward voltage drop of the switch 124. In an exemplary embodiment, the diodes 126 and 128 may be Schottky diodes and the switch 124 may be a bipolar junction transistor (BJT). Whenever Vo is less than the reference Vr, the under voltage detection switches 122 and 124 may be enabled and boosted voltage may be current limited through a current limit circuit 130 comprised of resistor 132, resistor 134, diode 126, diode 128 and switch 124. Thus, the voltage clamper circuit 110 may operate such that its output voltage is within a hysteresis band whose limits are set by the under-voltage detection switches 122 and 124 and the current limit circuit 130.

In the embodiment of the power supply shown in FIG. 1, an input voltage range may be 18V to 32V, as an example. The boost converter 106 may charge the capacitor bank 108 to a voltage Vb of about 70V, as an example. During normal operating conditions, the voltage clamper circuit 110 may cut off the boost converter 106 from the DC-DC converter 102. The DC-DC converter 102 may operate on the conditioned power coming from the hot swap circuit 104 and EMI filter. During a power interrupt, under voltage detection may result in turn on of the voltage clamp circuit 110 which may linearly clamp the boosted 70V to a nominal voltage of 27V. The DC-DC converter 102 would thus see only an input operating voltage range Vo voltage of about 18V to 32V and not the boosted voltage of 70V.

It should be understood, of course, that the foregoing relates to exemplary embodiments of the invention and that modifications may be made without departing from the spirit and scope of the invention as set forth in the following claims.

We claim:

1. A voltage clamping circuit for a power supply comprising:
    an input connection;
    an output connection;
    two semiconductor clamping switches connected in a series pass configuration and interposed between the input connection and the output connection; and
    a first semiconductor under-voltage detection switch and a second semiconductor under-voltage detection switch, along with a resistor feedback circuit interposed between the input connection and the output connection.

2. The voltage clamping circuit of claim 1 wherein the clamping switches are Metal-Oxide Semiconductor Field-Effect transistors (MOSFETs).

3. The voltage clamping circuit of claim 1 further comprising:
    the first semiconductor under-voltage detection switch connected in series with one of the clamping switches; and
    two diodes connected with the first semiconductor under-voltage detection switch to reduce temperature dependence of forward voltage drop of the first semiconductor under-voltage detection switch.

4. The voltage clamping circuit of claim 3 wherein the two diodes are Schottky diodes.

5. The voltage clamping circuit of claim 3 wherein the first semiconductor under-voltage detection switch is a bipolar junction transistor (BJT).

6. The voltage clamping circuit of claim 3:
    wherein the voltage clamping circuit includes an operational amplifier with a built-in reference; and
    wherein the operational amplifier is interconnected with the first semiconductor under-voltage detection switch and the output connection to enable operation of the first semiconductor under-voltage detection switch responsively to a condition in which power is not provided at the output connection at a voltage within a desired voltage range.

* * * * *